(12) United States Patent
Alpert

(10) Patent No.: US 7,235,110 B2
(45) Date of Patent: *Jun. 26, 2007

(54) METHOD FOR DYEING FABRIC MATERIALS WITH INDIGO, OTHER VAT DYES, AND SULFUR DYES

(76) Inventor: Melvin Alpert, 3209 NW. 89th Ave., Coral Springs, FL (US) 33065

( * ) Notice: Subject to any disclaimer, the term of this patent is extended or adjusted under 35 U.S.C. 154(b) by 0 days.

This patent is subject to a terminal disclaimer.

(21) Appl. No.: 11/273,354

(22) Filed: Nov. 14, 2005

(65) Prior Publication Data

US 2006/0059635 A1 Mar. 23, 2006

Related U.S. Application Data

(63) Continuation-in-part of application No. 10/781,449, filed on Feb. 18, 2004, now Pat. No. 6,997,962.

(51) Int. Cl.
D06P 1/22 (2006.01)
D06P 1/30 (2006.01)
D06P 1/52 (2006.01)

(52) U.S. Cl. .................. 8/465; 8/650; 8/652; 8/653; 8/554; 8/557; 8/558; 8/637.1; 8/661; 8/930

(58) Field of Classification Search .......... 8/554, 8/650, 652, 465, 557, 558, 637.1, 653, 661, 8/930
See application file for complete search history.

(56) References Cited

U.S. PATENT DOCUMENTS

| | | |
|---|---|---|
| 3,457,022 A | 7/1969 | Fields |
| 3,576,589 A | 4/1971 | Coon |
| 4,036,587 A | 7/1977 | Wolf et al. |
| 4,131,423 A | 12/1978 | Kato |
| 4,166,717 A | 9/1979 | Fono et al. |
| 4,322,214 A | 3/1982 | Manabe et al. |
| 4,536,907 A | 8/1985 | Zumbrunn et al. |
| 4,740,214 A | 4/1988 | McBride et al. |
| 4,756,037 A | 7/1988 | McFadyen et al. |
| 4,767,421 A | 8/1988 | Van der Veen et al. |
| 4,780,102 A | 10/1988 | Harper, Jr. |
| 4,845,789 A | 7/1989 | Morton et al. |
| 5,139,530 A | 8/1992 | Blanchard et al. |
| 5,295,998 A | 3/1994 | Merritello et al. |
| 5,298,584 A | 3/1994 | Blanchard et al. |
| 5,330,540 A | 7/1994 | McBride et al. |
| 5,348,997 A | 9/1994 | Kato et al. |
| 5,494,491 A | 2/1996 | Gurley |
| 5,647,875 A | 7/1997 | Dixon |
| 5,935,273 A | 8/1999 | Kruger et al. |
| 5,944,852 A | 8/1999 | Lin et al. |
| 6,004,358 A | 12/1999 | Kruger et al. |
| 6,022,383 A * | 2/2000 | Kuwabara et al. ............. 8/436 |
| 6,123,741 A | 9/2000 | Girbaud et al. |
| 2005/0097685 A1 | 5/2005 | Scuthe et al. |

* cited by examiner

*Primary Examiner*—Lorna M. Douyon
*Assistant Examiner*—Nguyen Tri
(74) *Attorney, Agent, or Firm*—Ronald V. Davidge

(57) ABSTRACT

A method for surface dyeing a range of textile materials, in the form of yarn, fabric, or garments, includes: a) preparing a dyebath including dye particles and an additive, such as an anionic acrylic copolymer, causing the particles to become charged; b) preparing the textile material by applying an additive, such as a cationic polyamide, forming a substrate with a charge attracting the particles, c) immersing the textile material in the dyebath; d) chemically reducing the dye particles retained on the textile material to a leuco form; and e) oxidizing the dye material.

33 Claims, 2 Drawing Sheets

METHOD FOR DYEING FABRIC MATERIALS WITH INDIGO, OTHER VAT DYES, AND SULFUR DYES

CROSS-REFERENCE TO A RELATED APPLICATION

Field of the Invention This is a continuation in part of U.S. patent application Ser. No. 10/781,449, filed Feb. 18, 2004, now U.S. Pat. No. 6,997,962 B2.

BACKGROUND OF THE INVENTION

1. Field of the Invention

This invention relates to the dyeing of cotton, flax, hemp, wool, silk, and blends of such materials with synthetic materials, in the form of yarn, fabric, or woven or knitted articles of clothing, in a batch or continuous process.

2. Summary of the Background Art

Vat dyes form a large class of dyes that are applied to textile fibers in chemically reduced leuco forms that are water soluble. Then, an oxidation process is applied to return the leuco forms to insoluble dyes having the desired colors on the surfaces of the fibers or dispersed through the fibers, depending on the materials and process. This large class of dyes can be used to produce a wide variety of colors in textiles.

The most widely used vat dye is Indigo, which has been used to dye cellulose-based textiles, such as cotton, for centuries. Since indigo is practically insoluble in water, ether, alcohol, and dilute acids, conventional dyeing processes include reducing the indigo dye to a soluble leuco form having a yellow-green color, using a suitable reducing agent with an alkaline material. After the fabric material is then exposed to the leuco form in a bath, the fabric material is exposed to air or oxygen so that the reduced dye within the fabric is oxidized, returning to an insoluble form in which the blue color is apparent. Since, even in the leuco form, indigo has a low affinity for textile materials, these steps are repeated as often as needed to obtain the desired shade of blue, with five to seven immersions typically being used, and with each of these immersions being followed by an oxidation process.

Conventional processes for dyeing fabric materials with sulfur dyes also include a step of chemically reducing the dye before it is applied to the material. For example, after being made water soluble by chemical reduction, a sulfur dye is applied within a pad-steam process to be subsequently squeezed off under a defined pressure. Then, the dye is diffused into the fibers during a steaming process. Alternately, in a pad-dry-pad-steam process, the sulfur dye is applied to the fabric in a dispersed or dissolved form and is then squeezed off under a defined pressure. Then, a downstream chemical pad is applied, impregnating the fabric so that dye diffusion into the fibers is achieved by steaming. Either of these processes is followed by rinsing and oxidation of the dye, resulting in through dyeing of the fiber.

In a pad-dry process, a reduced sulfur dye is applied to the fabric to be subsequently squeezed off under a determined pressure. The treated fabric then passes through a pre-dryer having a downstream hot flue, in which the dye material is partially oxidized, and through additional rinsing and oxidation. While the dye material remains at the surface of the fiber, its level of fixation is undesirably low, leading to difficulties in establishing a consistent and reproducible dyeing process.

For both fabric materials dyed with vat dyes, such as indigo, and for fabric materials dyed with sulfur dyes, a significant market exists for materials dyed with a controllable and reliable "surface dyeing" process, in which a layer of dye material is adhered to the surface of the yarn or fabric without substantial penetration within the substrate. Such materials can be mechanically abraded to produced a "stonewashed" appearance, with a portion of the dye material being removed from the surface to reveal an undyed or differently colored core within the fiber. Alternately, such material may be chemically treated, for example with enzymes, to change the color of a part of the outer surface so that a similar appearance is produced.

Commercially successful processes for dyeing cotton fabrics with indigo have been generally limited to continuous processes for dyeing warp yarn to be used in the production of blue jeans and other denim products. Such a continuous process is described, for example, in U.S. Pat. No. 3,457,022 as a process in which the yarn is first dipped in hot dye solutions to achieve maximum penetration of the dye within the yarn, which is then repeatedly dipped in cold dye solutions to obtain the desired color.

Other patents describe the chemical components of the dye bath. For example, U.S. Pat. No. 4,166,717 describes a process in which the indigo is reduced to its soluble leuco form with sodium hydrosulfate and maintained in an aqueous solution with sodium hydroxide. An aldehyde addition product, such as formaldehyde, acetaldehyde, or furfural, is added to the solution, with an adduct, such as a bisulfate or a sulfoxylate.

U.S. Pat. No. 5,935,273 describes a process for the continuous dyeing of yarn containing cellulose in a single passage through an aqueous solution of indigo in its reduced, or leuco, state in a dye liquor additionally containing deoxidants, alkali, and a dissolved alkali metal salt at a concentration of 100 to 200 grams/liter as an electrolyte as a pH value of the liquor is adjusted to about 10.2 to 11.3. As the electrolyte concentration is maintained, the yarn is exposed to a gas that dissolves in the aqueous solution while forming an acid. Suitable gasses are carbon dioxide, hydrogen chloride, formic acid vapor, and acetic acid, with carbon dioxide being preferred, with the use of carbon dioxide to establish maintain and control pH in dyeing processes being further discussed in U.S. Pat. No. 5,295,998, and with the use of carbon dioxide to effect an accelerated neutralization of cellulose textile substrates being additionally discussed in U.S. Pat. No. 4,536,907. Then the reduced indigo in the yarn is oxidized to form a pigment, with the dyeing process.

The conventional process includes labor-intensive steps associated with the handling of the yarn, such as warp beam make-up and yarn quilling. To eliminate such steps, what is needed is a method for dyeing garments instead of the yarn used in their production. Additionally, dying garments provides for effective inventory control, and for the color coordination of garments containing different types of yarns or knitted and woven materials.

U.S. Pat. No. 4,845,789 describes a process for the rapid dyeing of a series of successive garments or batches of garments with a vat dye, preferably indigo dye. While the garments are being constrained, they are submerged in, and impregnated with, a dyeing solution in a first bath. Then, they are removed from the first bath and held with the draining from them to be conserved for reuse. Next, the garments are promptly immersed in an oxidizing solution in a second bath to shock oxidize the dye present in the garments, which are then removed from the oxidizing bath while draining the oxidizing solution and preserving it for reuse. The garments are then washed and dried. The time between removal of the garments from the dyeing solution and their placement in the oxidizing solution is less than five minutes.

U.S. Pat. No. 4,756,037 describes a process for dyeing with a vat dye, such as an indigo dye solution, a series of successive garments made with fabric containing cellulose. The garments are supported on supports that keep all fabric surfaces of each garment accessible to treating solutions, so that the materials are uniformly impregnated with a dye solution at a first bath. The garments are then inserted in an oxidizing solution within a second bath to uniformly oxidize the dye present within each garment.

U.S. Pat. App. Pub. No. 2005/0097685 A1 describes a process for producing a reproducible ring dye using sulfur dyes on fabrics containing textile fibers and on blended fabrics containing textile fibers. The process comprises, following the application of a sulfur dye vat to the fabric, a step in which the dye is fixed and incipiently oxidized at a temperature of 80 to 160 degrees C., and preferably between 120 and 130 degrees C., and at a moisture content of 5 to 50 percent, and preferably between 20 and 30 percent.

U.S. Pat. No. 4,131,423 describes a process for dyeing fibers using a water-insoluble dye, such as a sulfur dye. The process comprises reductive dissolution and oxidative fixing using an oxyhalogen acid as an oxidizing agent.

U.S. Pat. No. 4,322,214 describes a process for dyeing textile materials, such as fiber and cloth more satisfactorily with sulfur dyes or sulfurized vat dyes, with an organic mercapto compound and/or an organic sulfur compound capable of generating mercapto groups under dyeing conditions being present in dye baths. Still more improved dyeing results may be obtained by allowing a sulfite salt compound to be further present in such dye baths.

The patent art additionally describes a number of other methods for treating textile material and blends including cellulose to improve dyeability. For example, a method for producing anionically dyeable smooth dry crosslinked cellulose is described in U.S. Pat. No. 5,298,584, with a cellulose-containing material being modified with a combination of a hydroxyalkylamine or a hydroxyalkyl quaternary ammonium salt, one or more glycols, and a crosslinking agent. The reaction is typically catalyzed with salts such as zinc nitrate or magnesium chloride, used either alone or in conjunction with citric acid. Types of usable anionic dyes include acid, direct, and reactive dyes. The cellulose-containing material may be in the form of fibers, yarns, slivers, and paper. U.S. Pat. No. 5,139,530 describes the production of anionically dyeable smooth-dry crosslinked textile materials by treatment of methylolamide crosslinked textile materials with an alkali swelling agent such as sodium hydroxide before dyeing. U.S. Pat. No. 3,576,589 describes a method for dyeing a fabric, such as a polyester/cotton fiber, in a vat/disperse dye system, using hydroxylamine sulfate under conditions of thermal fixation. The hydroxylamine sulfate is maintained at a pH in the range 5.0 to 6.5 in a vat/disperse dye pad to obtain maximum penetration of the dye within the fibers of the fabric. U.S. Pat. No. 4,767,421 describes a method of manufacturing a homogeneous water-insoluble dye layer on a substrate, with a solution of a cationic or anionic dye in an organic solvent being provided on the substrate, with the solvent being removed, and with the resulting dye layer being treated with am aqueous solution of a salt. The cation of the anionic dye is exchanged for the cation of the salt. Alternately, during treatment with an aqueous solution of a salt or acid, the anion of the cationic dye is exchanged for the salt or acid.

U.S. Pat. No. 5,647,875 describes a method for producing a desired color shade by treating a dyed textile substrate, which has an initial color shade, partly due to color caused by the presence thereon of a vat dye and partly due to color caused by the presence thereon of a sulfur dye, with a chlorine-free decolorizing agent, such as hydrogen peroxide, in an aqueous alkaline medium. The color shade is modified by removing a portion of the color attributable to the sulfur dye within removing as large a proportion of the color attributable to the vat dye.

What is needed is a method for dyeing fabrics and garments formed from fibers including cellulosics, wool, and silk with a vat dye, such as indigo, as well as for dyeing the yarn used to make such fabrics and garments. Additionally, what is needed is a method for dyeing cellulosics, wool, and silk without relying on multiple dips to get a suitable shade. Furthermore, what is needed is a method allowing the use of batch processes, such as pad-jig dyeing and dyeing within a rotary dyeing machine to dye textile materials with indigo. Additionally, what is needed is a controllable method for reliably and consistently ring dyeing various substrates with vat and sulfur dyes, so that a satisfactory level of adhesion of the dye is consistently achieved at the surface of the fibers.

SUMMARY OF THE INVENTION

In accordance with an aspect of the invention, a method is provided for dyeing a textile material. The method includes:

preparing a dyebath including pigment particles of a vat dye or of a sulfur dye and a first additive causing the pigment particles to become electrically charged in a first polarity;

preparing the textile material for dyeing by applying a second additive to the textile material to form a substrate on the textile material having an ionic charge with a polarity opposite the first polarity;

immersing the textile material prepared for dyeing in the prepared dyebath to cause the pigment particles to be ionically attracted to the substrate and retained thereon;

chemically reducing the pigment particles retained on the surface of the substrate to form a soluble reduced form entering the textile material; and oxidizing the reduced form of the pigment particles to form pigment particles within the textile material.

The textile material to be dyed may be any cellulosic, wool, silk, or a blend of such materials with synthetic fibers, in the form of yarn, woven or knitted cloth, or garments.

Preferably, the first polarity is negative, with the first additive being an anionic acrylic copolymer, while the second additive is a cationic polyamide or polyamine.

The method may be performed in a rotary dyeing machine, with multiple baths being added and drained between the process steps, in a pad-jig process, with the textile material being fed entirely through multiple baths added and drained within a jig bath vessel, or in a continuous process, with the textile material simultaneously moving through multiple baths.

DETAILED DESCRIPTION OF THE INVENTION

Figure 1:
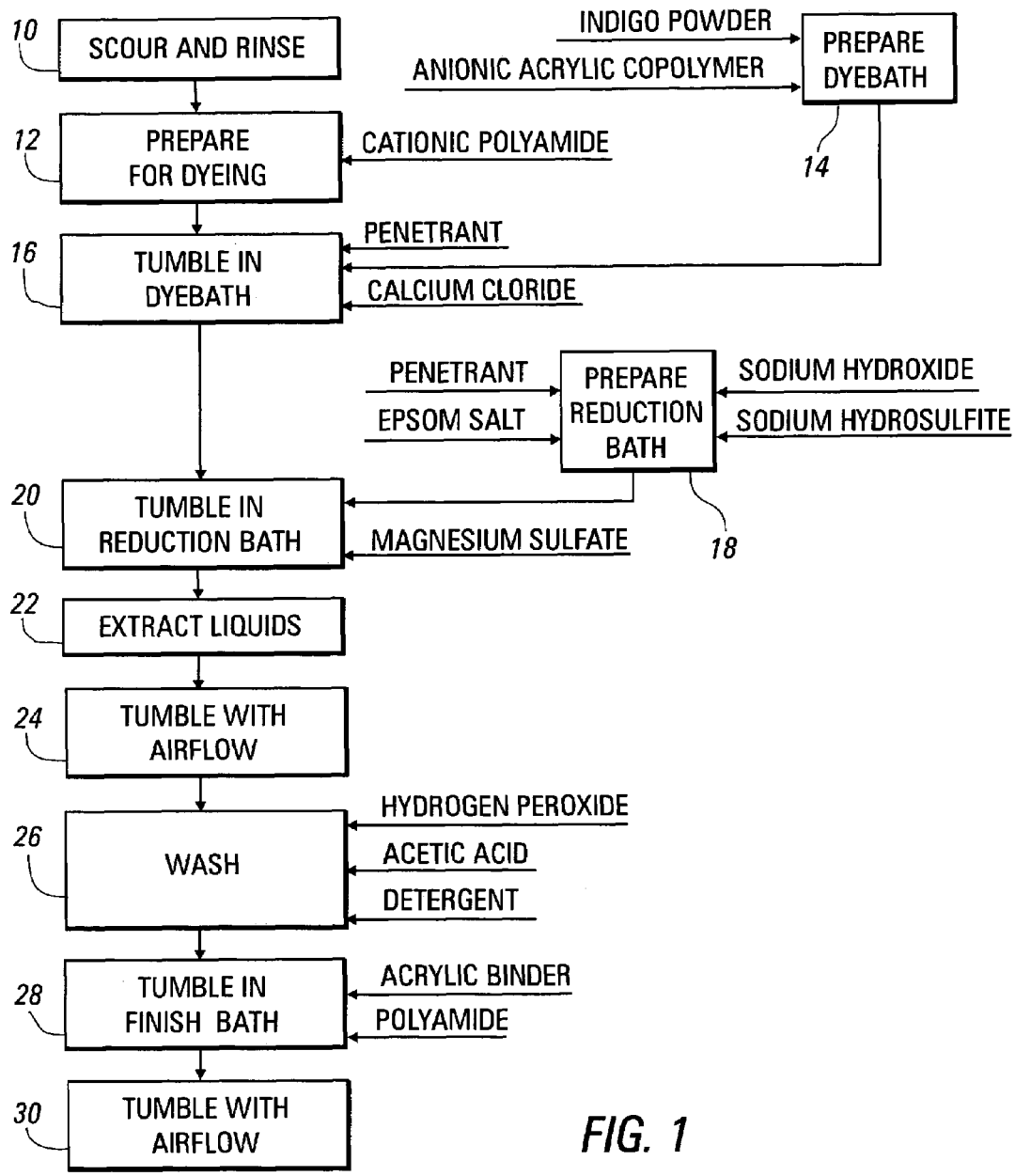
FIG. 1 is a flow chart showing the steps of a batch process performed according to the invention within a rotary dyeing machine.

In accordance with the present invention, a dyebath is prepared for dyeing textile material, with dye particles of a vat dye or of a sulfur dye in their pigment form being mixed with a first additive, causing the dye particles to become electrically charged in a first polarity. For example, an anionic acrylic copolymer is used as the first additive in an aqueous bath to make the particles take on a negative charge, making the treated dye particles anionic. As the dye particles become charged in this way, they also become rapidly and evenly dispersed within the bath, apparently due to the fact that these similarly charged particles repel one another.

The textile material to be dyed may be a cotton fiber, a flax fiber, a hemp fiber, a wool fiber, or a blend of such fibers and synthetic fibers, in the form of yarn, woven or knitted cloth, or finished articles of clothing. In accordance with the present invention, this material is prepared by treatment with a second additive causing a substrate to be formed on the textile material, with the substrate having an ionic charge opposite in polarity to the charged pigment particles. For example, if the pigment particles are negatively charged, the textile material is treated with a second additive, such as a cationic polyamide, causing a cationic substrate to be formed. Such a material additionally crosslinks to form a strong bond with the textile material. Preferably, this process is continued until the dyebath is exhausted, with essentially all of the dye particles being transferred to the textile material.

Following immersion in the dyebath, the textile material placed in a reduction bath with the ionic bonds continuing to hold the pigment particles in place on the substrate. In the reduction bath, the pigment particles are reduced to a soluble reduced form to enter the fibers of the textile material.

Following the reduction bath, an oxidation process is applied to return the dye in its reduced state to its pigment form. Oxidation may be accomplished in several ways. For example, if the textile material is a roll of fabric, the fabric may be opened and passed through a vacuum extractor to pull liquids from the fabric. Then, the fabric is fed around cold cylinders. Alternately, the textile material may be passed through a chamber in which it is exposed to ozone for a few seconds. The ozone oxidizes the dye and removes most of the sulfites that otherwise interfere with fixation of the dye. If the textile material is a garment being dyed in a batch process within a rotary machine, oxidation occurs while the garments are tumbled without water, with the door of the machine open, or with air being pumped into the machine while the garments are drying. Following oxidation in air, the garments are preferably rinsed with peroxide and acetic acid to remove sulfites.

While indigo is the most widely used form of a vat dye, its use in a conventional process has a problem associated with the limited affinity of indigo in its soluble leuco form for textiles. This problem has limited the application of the leuco form to cotton materials in the conventional process to about 0.3% of the weight of the cotton materials per dip, with about 2% being needed to produce a deep shade upon subsequent oxidation to the pigment state. Therefore, the conventional process typically requires five to seven dips, with oxidation occurring between dips. On the other hand, it has been found such a limitation does not exist when indigo is applied in its pigment form to the surface if a textile material. For example, the process of the invention can readily be used in an exhaust bath to apply pigment equaling 3% of the weight of the textile material. Thus, a single application of dye according to the present invention produces the same shade as a conventional process including four to seven separate immersions in indigo in its leuco form, each of which is followed by oxidation.

FIG. 1 is a flow chart showing the steps of a batch process performed according to the invention within a rotary dyeing machine. For example, this process is used to dye garments in accordance with the present invention, with the garments first being scoured and rinsed in step 10. Next, in step 12, the garments are prepared for dyeing, by being tumbled within the rotary machine in an aqueous bath, including the phosphated alcohol sold as Penetrant EH equal in weight to 0.5% of the weight of the garments, a cationic polyamide equal in weight to 7% of the weight of the garments, at a temperature of 43° C. (110° F.) for 15 minutes. Alternatively, a similar weight of cationic polyamine may be added to the bath. After this step is completed, the rotary machine is drained.

In step 14, an aqueous dyebath is prepared, being composed of pigment particles having a weight equal to 2% of the weight of the garments and an ionic acrylic copolymer, also having a weight equal to 2% of the weight of the garments. For dyeing with indigo, liquid indigo paste having a weight equal to 20% of the weight of the garments can be used. The dyebath is prepared in hot water before being introduced into the rotary machine to start step 16.

In step 16, the garments are tumbled within the rotary machine in the dyebath prepared in step 14, with a phosphated alcohol sold as Penetrant EH equal in weight to 1% of the weight of the garments being dyed being added to the dyebath, along with magnesium sulfate equal in weight to 4% of the weight of the garments. After the garments have been tumbled in this dyebath for 12 minutes, calcium chloride equal in weight to 1% of the weight of the garments is added, with the garments being tumbled for an additional 5 minutes. Then the bath, which should be clear at this time, is drained.

In step 18, an aqueous reduction bath is prepared at 32° C. (90° F.), with the phosphated alcohol sold as Penetrant EH equal in weight to 1% of the weight of the garments being added to Epsom salt equal in weight to 2% of the weight of the garments. Then, sodium hydroxide is added to bring the pH to 11–11.5, with a 50% solution of the sodium hydroxide being, for example, approximately equal in weight to about 16% of the weight of the garments. Next, sodium hydrosulfite is added at a level of 6–10 grams per liter of bath, having a weight, for example, of about 32% of the weight of the garments.

In step 20, the reduction bath prepared in step 18 is added to the rotary machine, with the garments being tumbled until they take on a yellow green shade, indicating that the pigment particles have been reduced to a soluble form. Then, the reduction bath is drained, with the machine continuing to run. Then, in step 22, the machine is switched from tumble mode to a light extraction mode to extract some of the liquid. Then, in step 24, the door of the rotary machine is opened, or air is alternately pumped into the machine, while the garments are tumbled until they appear to be the desired color, due to the oxidation of the dye material in its leuco form to its pigment form. This takes about seven minutes.

Next, in step 26, a new bath is drawn at 43° C. (110° F.) for washing the garments. First, a 50% solution of hydrogen peroxide, weighing 0.5% of the weight of the garments, and glacial acetic acid, weighing 0.6% of the weight of the garments, are added to the bath, in which the garments are tumbled for five minutes. Then, a detergent having a weight equal to 0.5% the weight of the garments is added, and the garments are tumbled for another five minutes. Then, the bath is drained, and the garments are rinsed briefly.

Then, in step 28, a finish bath is drawn at 43° C. (110° F.) to apply a finish for wash and crock fastness of the dyed garments. A soft acrylic binder, having a weight equal to 2% of the weight of the garments, is added to the finish bath, along with polyamide having a weight equal to 2% of the weight of the garments. The garments are tumbled for in this bath for fifteen minutes. Then, the bath is drained, and the machine is run in an extract mode to extract the liquid. Finally, in step 30, the garments are tumbled dry, curing the finish applied in step 28.

Figure 2:
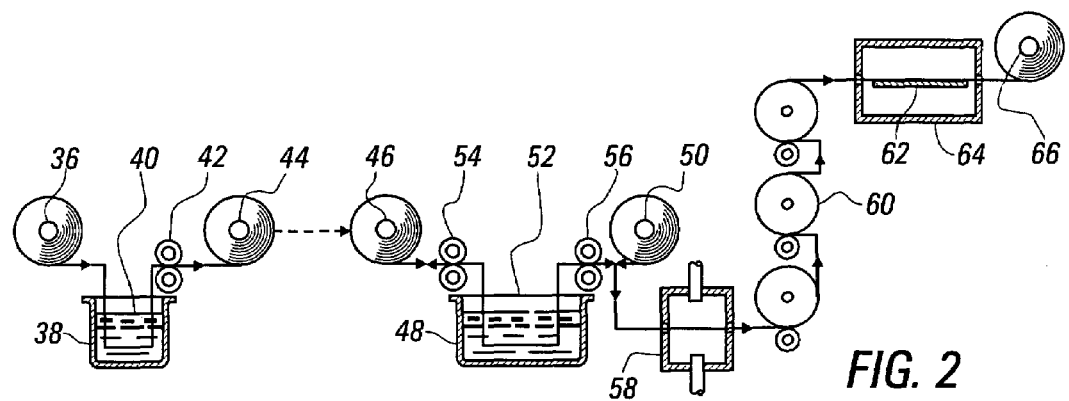
FIG. 2 is a schematic view of apparatus performing a pad-jig version of the process of FIG. 1.

FIG. 2 is a schematic view of apparatus performing a pad-jig dying process used, for example, to dye a roll 36 of woven textile material in accordance with the present invention. For this process, the pad vessel 38 is filled with a bath 40 including the phosphated alcohol sold as Penetrant EH having a weight equal to 1% of the weight of the woven material to be dyed, together with a cationic polyamide having a weight equal to 7% of the weight of the material to be dyed. During the padding process, the woven material is squeezed, together with liquid taken up with the material, between rollers 42 before being wound onto a take-up roll 44. During this padding process, the material is entirely moved through the bath 40, since the pad vessel 38 is shorter than the material in the direction in which the material is moved.

After the padding process is completed, the material from the take-up roll 44 is moved to serve as a first roll 46 for a jig bath vessel 48. Material is then moved between the first roll 46 and a second roll 50 in either direction, with the material being pulled through a bath 52 in the vessel 48. Rolls 54 are used to squeeze fluids from the bath into the material before it is rolled onto the first roll 46, and rolls 56 are used to squeeze fluids from the bath into the material before it is rolled onto the second roll 50. During each process of the material occurring within the jig bath vessel 48, the material is entirely moved through the bath 52 within the jig pad vessel at least once, since the jig bath vessel 48 is shorter than the material in the direction in which the material is moved.

The jig bath vessel 48 is first filled with water for an overflowing rinse of the material taken from the padding process. During a first rinse, the material is moved through the bath 52 twice, from one end to the other and back again. Next, the rinse water is drained, and the jig bath vessel 48 is filled with a dyebath having a temperature set at 38° C. (100° F.). The phosphated alcohol sold as Penetrant EH is added to the dyebath, in an amount having a weight equal to 1% of the weight of the material being dyed, along with magnesium sulfate having a weight equal to 4% of the weight of the material. Then, pigment particles having a weight equal to 2% of the weight of the material to be dyed, having been previously treated with an anionic acrylic copolymer also having a weight equal to 2% of the weight of the material is then added to the dyebath. The material is then run through the dyebath within the jig pad vessel four times from one end to the other four times. Calcium chloride having a weight equal to 4% of the weight of the material being dyed is then added to the dyebath, with the dyeing process being continued while the material is run through the dyebath six additional times.

Then, the dyebath within the jig bath vessel 48 is drained, and a reduction bath that has been prepared at 32° C. (90° F.) is added to the vessel 48. The reduction bath is an aqueous bath composed of the phosphated alcohol sold as Penetrant EH in a weight equal to 0.5% of the weight of the material being dyed, of Epsom salt having a weight equal to 1% of the weight of this material, of sodium hydrosulfite having a weight equal to 16% of the weight of this material, and of a 50% solution of sodium hydroxide having a weight of 8% of the weight of this material. The material is then run through the reduction bath four times from one end of the material to the other.

Next, the reduction bath is drained, from the jig bath vessel 48, and an oxidation bath that has been prepared for oxidation of the dye material is added to the jig bath vessel 48. This oxidation bath is an aqueous bath comprising sodium bromate at a concentration of 2 grams per liter of water and glacial acetic acid at a concentration of 0.5 grams per liter of water. The material is run through the oxidation bath, held at 43° C. (110° F.) twice from one end to the other. Then, this oxidation bath is drained from the jig bath vessel 48, which is refilled with the oxidation bath, having the same temperature and concentration of chemicals, and the material is run through the oxidation bath two more times. This process is then repeated, so that the material is treated with three separate oxidation baths.

After the third oxidation bath has been drained from the jig bath vessel 48, a wash bath is prepared at 43° C. (110° F.) within the jig bath vessel 48. The wash bath is an aqueous bath initially composed of a 50% solution of hydrogen peroxide having a weight equal to 1% of the weight of the material being dyed. The material is run twice through this wash bath from one end of the material to the other. Then, a detergent having a weight equal to 0.3% of the weight of the material is added to the wash bath, and the temperature of the bath is raised to 49° C. (120° F.), before the material is run through the wash bath three more times from one end to the other. After the wash bath has been drained, water is added to the jig bath vessel 48 as the material is run through the vessel 48 twice from one end to the other for overflowing rinses.

After the rinse water is drained from the jig bath vessel 48, this vessel 48 is filled with a finish bath including an acrylic binder having a weight equal to 3% of the weight of the material being dyed and a polyamide having a weight also equal to 3% of the weight of the material being dyed. The material is then run through this finish bath from one end to the other of the material four times. In the last pass through the finish bath, the material is not rewound on roll 50, but is rather passed through a vacuum extractor 58 for removal of the liquid, and is dried by being pulled over a number of rolls 60, through which hot air is circulated to hold the rolls 60 at 138° C. (280° F.). Then, the finish of the material, which has been applied in the finish bath, is cured at 160° C. (320° F.) on a frame 62 within an enclosure 64, before the material is wound on a take-up roll 66.

Figure 3:
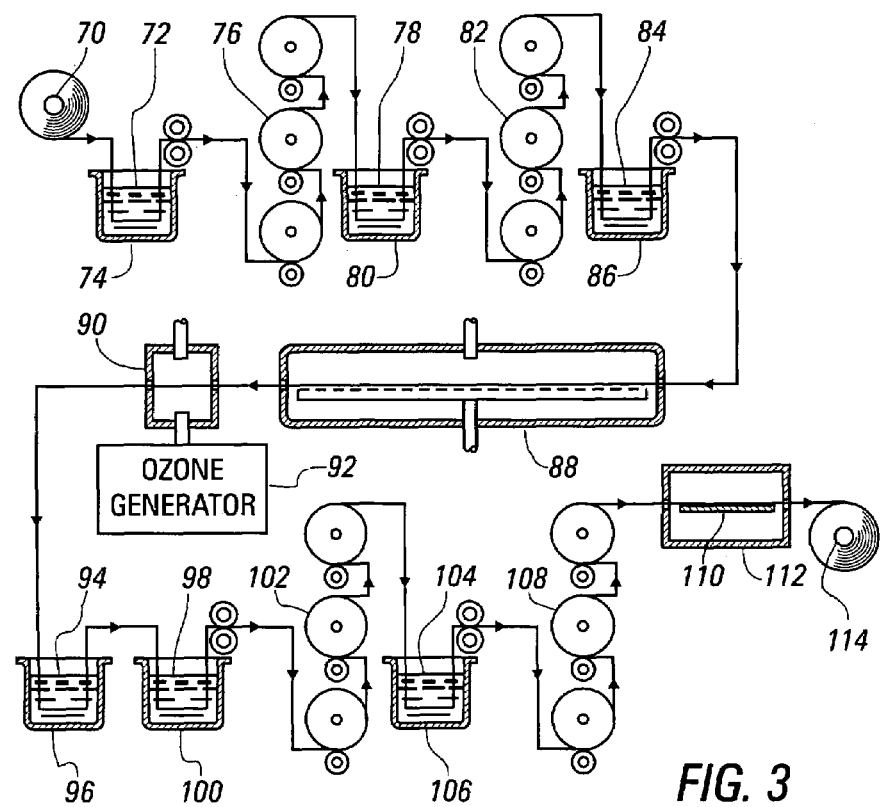
FIG. 3 is a schematic view of apparatus performing a continuous version of the process of FIG. 1.

FIG. 3 is a schematic view of apparatus performing a continuous dyeing process used, to dye a roll 70 of woven textile material in accordance with the present invention. In the continuous dyeing process, the steps of the invention are performed simultaneously in apparatus arranged so that the steps are performed in the described order on each section of the woven textile material as it is run through the apparatus.

The woven material from the supply roll 70 is first run through a preparation bath 72 in a first vessel 74 to be prepared for dyeing by being coated With a cationic polyamide. The preparation bath 72 is preferably operated at 65° C. (149° F.), with the concentration of the cationic polyamide being held at a level causing the material picks up 7% of its weight in cationic polyamide. Then, the material is dried on cylinders 76 held at 129° C. (265° F.) by hot air flowing through the cylinders.

After exiting the heated cylinders 76, the material is run through a dyebath 78 in a second vessel 80. The dyebath 78 is preferably an aqueous bath held at 43° C. (110° F.) includes pigment particles dispersed with an anionic acrylic copolymer having a concentration held to match the concentration of the pigment particles. The concentration of the pigment particles is preferably held at a level causing the material to take up 2% of its weight in pigment from the dyebath 78. Then, the material is dried on cylinders 82 held at 129° C. (265° F.) by hot air flowing through the cylinders.

After exiting the heated cylinders 82, the material is run through a reduction bath 84 in a third vessel 86. The reduction bath 84 preferably is an aqueous bath including 45 grams per liter of water of sodium hydrosulfite and a similar concentration of a 50% solution of sodium hydroxide to convert the pigment particles to their water-soluble reduced form. The material is transported from the reduction bath 84 to an airless steamer 88 operating at a temperature of 104° C. (220° F.), which is preferably configured so that an area of the material is steamed for one minute within the steamer 88. After exiting the steamer 88, the material is pulled through an oxidation chamber 90 fed by a corona discharge ozone generator 92 producing 100–300 grams per hour. Within the chamber 90, the dye in its reduced form is oxidized, being returned to its pigment state. The exposure of the material to ozone additionally promotes the removal of sulfites within the material. Alternately, the material may be oxidized by exposure to oxygen or by being run through a bath including sodium bromate and acetic acid.

After leaving the oxidation chamber 90, the material is fed into a wash bath 94, including water held at 60° C. (140° F.) and a non-ionic detergent, within a wash box 96. Then, the material is fed through a plain water rinse 98 held at 43° C. (110° F.) at a rinse vessel 100, before being dried on heated cylinders 102 held at 129° C. (265° F.). From the heated cylinders 102, the material is run through a finish bath 104 within a finish vessel 106 including an acrylic binder, such as the product sold as RHOPLEX K-3, and polyamide. After exiting the finish bath 104, the material is dried on heated cylinders 108, which are also held at 129° C. (265° F.). Then the material is cured at (325° F.) on a frame 110 within a chamber 112 for one minute. Finally, the finished material is rolled on a take-up roll 114.

EXAMPLE 1

Dyeing Knitted and Woven Cotton Garments in a Rotary Machine with a Combination of indigo Pigment and Another Organic Pigment In a first exemplary application of the invention, knitted t-shirts made of cotton and woven cotton dress shirts were dyed in a rotary machine turning at 18 rpm with indigo and with another organic pigment. The process described above in detail in reference to FIG. 1 was used, except as noted below. This process produced garments that were dyed a very bright full navy blue color.

In step 10, the garments were scoured for fifteen minutes at (180° F.) with an industrial soap, sold under the name LT-SPECIAL, followed by a rinse for 10 minutes at (120° F.). In step 14, the dyebath was prepared with a combination of indigo powder having a weight equal to 1.5% of the weight of the garments, and a phthalocyanine organic pigment, also having a weight equal to 1.5% of the weight of the garments. The dyebath was pasted with the anionic acrylic copolymer having a weight equal to 3% of the weight of the garments before hot water was added to the mix. In step 20, both the garments and the reduction bath turned a green color formed by the combination of the yellow-green color of indigo in its leuco state, together with blue color remaining within the phthalocyanine pigment in just six minutes, when the reduction bath was drained. In step 24, the garments oxidized to a bright blue color in fifteen minutes. In the final portion of step 26, the garments were rinsed in cold water for five minutes.

EXAMPLE 2

Dyeing a Cotton Fabric in a Pad-Jig Process with Indigo Pigment

In a second exemplary application of the invention, 12-ounce cotton twill is dyed in the pad-jig process described above in reference to FIG. 2. Before beginning the process, the fabric is desized and scoured. During padding within the pad vessel 38, the fabric picks up about 71% of the polyamide in the bath 40. After the oxidation baths within the jig bath vessel 48, the roll of fabric is completely oxidized to a true indigo blue color, and the bath is clear.

EXAMPLE 3

Continuous Pad Steam Dyeing of a Cotton Corduroy Fabric with Indigo

In a third exemplary application of the invention, a corduroy cotton fabric material was desized, scoured, and bleached. Then, the material was dried and run through the process described in detail above in reference to FIG. 3.

EXAMPLE 4

Dyeing a Woven Flax Fabric on a Continuous Pad Steam Dyeing Range with Vat Dyes

In a fourth exemplary application of the invention, a woven flax fabric having an eight-ounce plain weave construction was desized, scoured, and bleached. Then, the material was dried and run through the process described in detail above in reference to FIG. 3, using a dye pad formula including 10 percent vat brown dye CI 5 and 2 percent vat grey dye CI 22.

EXAMPLE 5

Dyeing Knitted and Woven Cotton Garments in a Rotary Machine with a Combination of indigo Pigment and Sulfur Black Pigment In a fifth exemplary application of the invention, knitted t-shirts made of cotton and woven cotton dress shirts were dyed in a rotary machine turning at 18 rpm with indigo and with sulfur black pigment. The process described above in detail in reference to FIG. 1 was used, except as noted below. This process produced garments that were dyed a very dark navy color.

In step 10, the garments were scoured for fifteen minutes at (180° F.) with an industrial soap, sold under the name LT SPECIAL, followed by a rinse for 10 minutes at (120° F.).

In step 14, the dyebath was prepared with a combination of indigo powder having a weight equal to 1.5% of the weight of the garments, and a sulfur black pigment, also having a weight equal to 1.5% of the weight of the garments. The dyebath was pasted with the anionic acrylic copolymer having a weight equal to 3% of the weight of the garments before hot water was added to the mix. In step 20, both the garments and the reduction bath turned a greenish brown color formed by the combination of the yellow-green color of indigo in its leuco state, together with the reduced color of the sulfur black in just six minutes, when the reduction bath was drained. In step 24, the garments oxidized to a dark navy color in fifteen minutes. In the final portion of step 26, the garments were rinsed in cold water for five minutes.

EXAMPLE 6

Dyeing a Wool Fabric in a Pad-Jig Process with Indigo Pigment

In a sixth exemplary application of the invention, 12-ounce 100 percent wool fabric having a twill construction was dyed in the padjig process described above in reference to FIG. 2. Before beginning the process, the fabric was desized, scoured, and bleached. During padding within the pad vessel 38, the fabric picked up about 66% of the polyamide in the bath 40. After oxidation within the jig bath vessel 48, the roll of fabric was completely oxidized to a true indigo blue color, and the bath was clear.

EXAMPLE 7

Dyeing a Wool and Polyester Blended Fabric in a Continuous Pad Steam Process with a Blend of Sulfur Black and Indigo Pigments In a seventh exemplary application of the invention, a 60 percent wool, 40 percent polyester fabric having a 12-ounce twill construction was desized, scoured, and bleached. Then the material was dried and run through the process described in detail above in reference to FIG. 3, with the a dye including 2 percent indigo pigment together with 5 percent sulfur black pigment CI 1.

As described in the above examples, the processes of the invention may be applied using a vat dye, a mixture of two or more vat dyes, a sulfur dye, or a combination of a sulfur dye and a vat dye. Additionally, these processes may be applied using a mixture of sulfur dyes. Thus, the process is applied to a dyebath including pigment particles of a vat dye or of a sulfur dye, with the "or" being non-exclusive, allowing a combination of particles of a vat dye or of a sulfur dye.

The processes of the invention can be used to effect surface dyeing, in which the penetration of the dye into the fabric material is controlled to leave a core not dyed by the process. In this way, the fabric material may be subsequently processed to form a stonewashed appearance. Alternately, with the application of additional penetrating agents during the process, a through dyeing process can be achieved.

While the invention has been described in its preferred forms or embodiments with some degree of particularity, it is understood that this description has been given only by way of example, and that many changes can be made without departing from the spirit and scope of the invention, as described in the appended claims.

What is claimed is:

1. A method for dyeing a textile material, wherein the method comprises:
    a) preparing a dyebath including pigment particles of a vat dye or of a sulfur dye and a first additive causing the pigment particles to become electrically charged in a first polarity;
    b) preparing the textile material for dyeing by applying a second additive to the textile material to form a substrate on the textile material having an ionic charge with a polarity opposite the first polarity;
    c) immersing the textile material prepared in step b) in the dyebath prepared in step a) to cause the pigment particles to be ionically attracted to the substrate and retained thereon;
    d) chemically reducing the pigment particles retained on the substrate to form a reduced form of the pigment particles entering the textile material; and
    e) oxidizing the reduced form of the pigment particles to form pigment within the textile material.

2. The method of claim 1, wherein the first polarity is negative and the second additive is cationic.

3. The method of claim 2, wherein the first additive is an anionic acrylic copolymer.

4. The method of claim 2, wherein the second additive crosslinks with the textile material.

5. The method of claim 2, wherein the second additive is a cationic polymer selected from a group consisting of polyamide and polyamine.

6. The method of claim 2, wherein a batch of the textile material is prepared for dyeing in step b) by immersion within a preparation bath composed essentially of:
    water;
    a phosphated alcohol; and
    a cationic polymer selected from a group consisting of polyamide and polyamine.

7. The method of claim 6, wherein the cationic polymer has a weight of 7% of the weight of the batch of textile material.

8. The method of claim 6, wherein the batch of the textile material is treated in the preparation bath at a temperature of 43° C. for 15 minutes.

9. The method of claim 2, wherein a dyebath is prepared in step a) to dye a batch of the textile material, and wherein the dyebath is composed essentially of:
    water;
    the pigment particles; and
    an anionic acrylic copolymer.

10. The method of claim 9, wherein the pigment particles and the anionic acrylic copolymer each have a weight of 2–3% of the weight of the batch of the textile material.

11. The method of claim 10, wherein
    the dyebath is prepared in hot water for dyeing the batch of the textile material, and
    a phosphated alcohol and calcium chloride are added to the dyebath.

12. The method of claim 2, wherein a dyebath is prepared in step a) to dye a batch of textile material, and wherein the dyebath is composed essentially of:
    water;
    the pigment particles;
    an anionic acrylic copolymer; and
    a phthalocyanine organic pigment.

13. The method of claim 12, wherein
    the pigment particles and the phthalocyanine organic pigment each have a weight of 1.5% of the weight of the weight of the batch of the textile material, and the anionic acrylic copolymer has a weight equal to 3% of the weight of the batch of textile material.

14. The method of claim 1, wherein, in step d), the pigment particles retained on the substrate are reduced by immersion in a reduction bath comprising sodium hydroxide and sodium hydrosulfite.

15. The method of claim 14, wherein the reduction bath is composed essentially of:
water;
sodium hydroxide;
sodium hydrosulfite;
a phosphated alcohol; and
Epsom salt.

16. The method of claim 14, wherein
sodium hydroxide is added to the reduction bath in a concentration forming a pH of 11–11.5; and
sodium hydrosulfite is added to the reduction bath in a concentration of 6–45 grams per liter of water.

17. The method of claim 1, wherein
steps b), c), and d) are performed while tumbling the textile material in a rotary dyeing machine,
a bath preparing the textile material for dyeing in step b) is drained from the rotary dyeing machine before the dyebath prepared in step a) is added to the rotary dyeing machine, and
the dyebath is drained from the rotary dyeing machine before a reduction bath for chemically reducing the pigment particles is added to the rotary dyeing machine.

18. The method of claim 17 wherein step e) is performed by air flowing through the textile material while tumbling the textile material in the rotary dyeing machine.

19. The method of claim 17, wherein step e) is followed by tumbling the textile material within the rotary dyeing machine in a finish bath including an acrylic binder and a polyamide.

20. The method of claim 1, wherein
step c) is performed while the textile material is moved entirely through a dyebath within a jig bath vessel at least one time,
the jig bath vessel is shorter than the textile material in a direction in which the textile material is moved,
step d) is performed while the textile material is moved entirely through a reduction bath within the jig bath vessel at least one time, and
the dyebath is drained from the jig dyeing vessel before the reduction bath is added within the jig bath vessel.

21. The method of claim 20, wherein
the dyebath includes the pigment particles and an anionic acrylic copolymer, and
the reduction bath includes sodium hydrosulfite and sodium hydroxide.

22. The method of claim 20, wherein
step a) is performed while the textile material is moved entirely through a preparation bath within a pad vessel separate from the jig bath vessel,
the pad vessel includes a pair of rollers squeezing material from the preparation bath into the textile material, and
the pad vessel is shorter than the textile material in a direction in which the textile material is moved.

23. The method of claim 22, wherein the preparation bath includes a cationic polymer selected from a group including polyamide and polyamine.

24. The method of claim 20, wherein step e) is performed while the textile material is moved entirely through an oxidation bath including sodium bromate within the jig bath vessel three times.

25. The method of claim 20, wherein
step e) is followed by moving the textile material entirely through a finish bath within the jig bath vessel at least one time;
the finish bath includes an acrylic binder and a polyamide.

26. The method of claim 1, wherein steps b), c), and d) are performed simultaneously as the textile material is moved simultaneously through a first vessel holding a preparation bath in which step b) is performed, a second vessel holding a dyebath in which step c) is performed, and a third vessel holding a reduction bath in which step d) is performed.

27. The method of claim 26, wherein
the preparation bath includes a cationic polymer selected from a group comprising polyamide and polyamine;
the dyebath includes the pigment particles and an anionic acrylic copolymer, and
the reduction bath includes sodium hydrosulfite and sodium hydroxide.

28. The method of claim 26, wherein the textile material is dried as moves between the first and second vessels and as it moves between the second and third vessels.

29. The method of claim 26, wherein the textile material is moved from the third vessel through a steamer.

30. The method of claim 29, wherein the textile material is steamed for one minute within the steamer.

31. The method of claim 26, wherein step e) is performed within an oxidation chamber through which the textile material is moved as ozone is supplied to the oxidation chamber.

32. The method of claim 26, wherein the textile material is additionally moved through a finish bath including an acrylic binder and polyamide within a finish vessel.

33. The method of claim 1, additionally including, following step f), immersing the textile material in a finish bath including an acrylic binder and polyamide.

* * * * *